(12) United States Patent
Oh

(10) Patent No.: US 6,613,397 B2
(45) Date of Patent: Sep. 2, 2003

(54) METHOD AND APPARATUS FOR MANUFACTURING AN ALUMINUM CLAD PRODUCT

(75) Inventor: Seung Taek Oh, Chungcheongnam-do (KR)

(73) Assignee: Mando Climate Control Corporation, Chungcheongnam-Do (KR)

( * ) Notice: Subject to any disclaimer, the term of this patent is extended or adjusted under 35 U.S.C. 154(b) by 0 days.

(21) Appl. No.: 10/000,013

(22) Filed: Dec. 4, 2001

(65) Prior Publication Data

US 2002/0142100 A1 Oct. 3, 2002

(30) Foreign Application Priority Data

Mar. 31, 2001 (KR) ........................................ 2001-17123

(51) Int. Cl.[7] .............................. B05D 3/14; B05D 3/02; B05D 1/36; B23K 1/20
(52) U.S. Cl. .................... 427/540; 427/580; 427/376.1; 427/379; 427/380; 427/402; 427/404; 427/405; 228/209; 228/211; 228/223; 228/262.51
(58) Field of Search ............................. 427/540, 376.1, 427/379, 380, 404, 405, 409, 385.5, 407, 580; 228/209, 211, 223, 262.51

(56) References Cited

U.S. PATENT DOCUMENTS

| | | | | |
|---|---|---|---|---|
| 4,093,782 A | * | 6/1978 | Anthony et al. | 428/654 |
| 4,579,605 A | * | 4/1986 | Kawase et al. | 148/26 |
| 5,360,158 A | * | 11/1994 | Conn et al. | 228/56.3 |
| 6,244,497 B1 | * | 6/2001 | Conn et al. | 228/119 |
| 6,279,811 B1 | * | 8/2001 | Ramarge et al. | 228/121 |
| 6,344,237 B1 | * | 2/2002 | Kilmer et al. | 427/190 |

* cited by examiner

*Primary Examiner*—Michael Barr
(74) *Attorney, Agent, or Firm*—Bacon & Thomas

(57) ABSTRACT

In a method for manufacturing an Al clad product, first, cladding material is fused and coated on base material having Al. Then, slurry material is coated on the cladding material coated on the base material, the slurry material including mixture of a flux powder, a resin binder powder and a diluent. Thereafter, the slurry material is hardened to thereby provide a hardened product including the base material, the cladding material and hardened slurry material. In a subsequent step, the hardened product is brazed to thereby provide an Al clad product, wherein the diluent included in the slurry material is gasified in the hardening process of the slurry material and the cladding material is fused by employing an arc discharge technique.

8 Claims, 7 Drawing Sheets

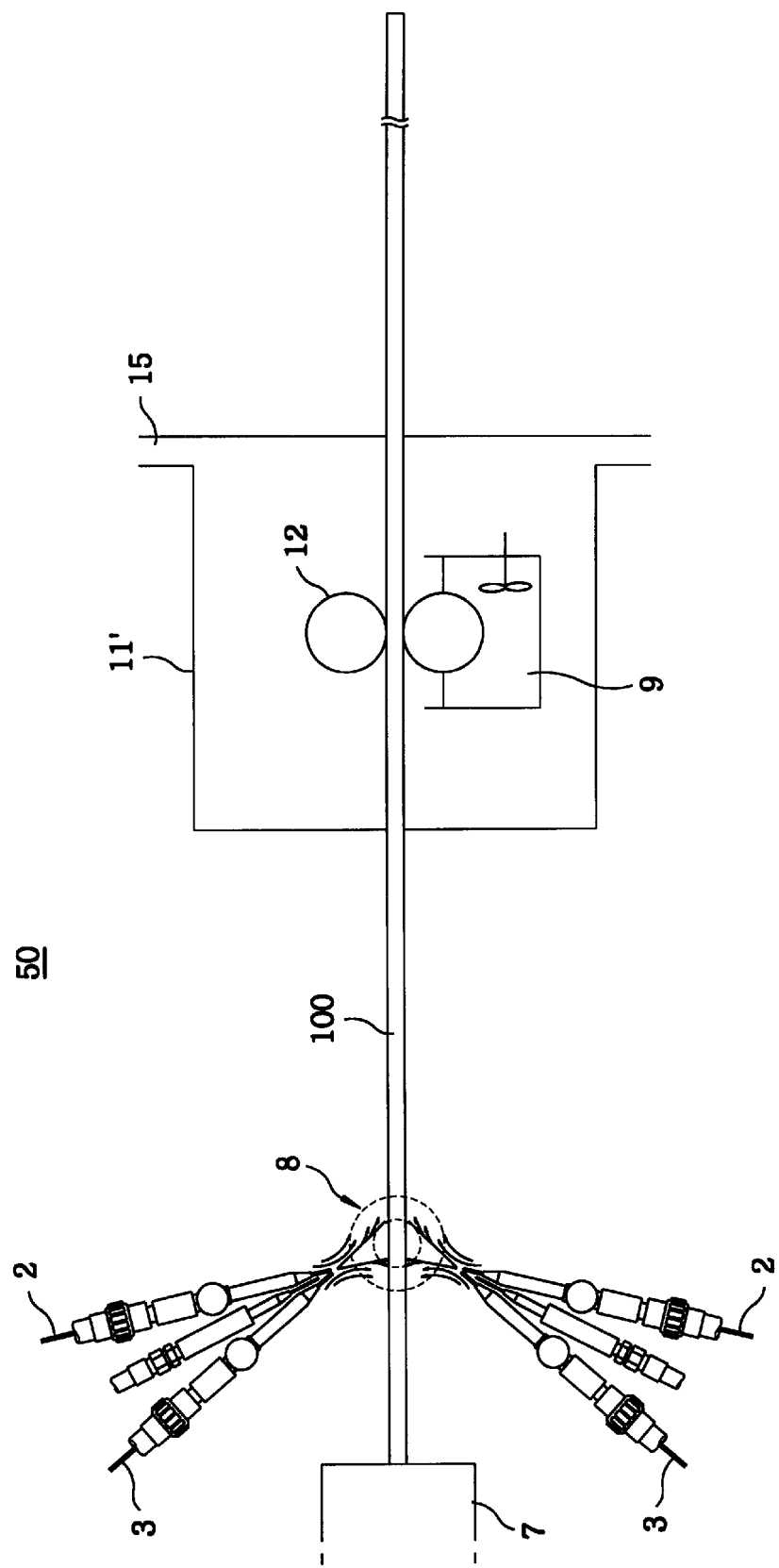

METHOD AND APPARATUS FOR MANUFACTURING AN ALUMINUM CLAD PRODUCT

FIELD OF THE INVENTION

The present invention relates to a method and apparatus for manufacturing an Al clad product; and, more particularly, to a method and apparatus for manufacturing an Al clad product for use in a heat exchanger.

BACKGROUND OF THE INVENTION

In general, a heat-exchanger includes a header, a coolant tube and fins. A heat exchange is carried out when a coolant flows through the coolant tube of the heat-exchanger. In a conventional method for manufacturing the heat-exchanger, the coolant tube and the fins are assembled by preparing core material of the fins and clad-rolling clad material at both sides of each fin along with the core material. A bare material, not a clad material, is used as the coolant tube. The assembled coolant tube and fins are bonded by brazing in a brazing furnace.

Since, however, the clad material, which is expensive, is coated on both sides of the fins, required costs are considerable in the conventional method. A vacuum brazing technique is recently losing the popularity despite its merit that it does not require a flux. It is because the vacuum brazing is excessively time-consuming. Instead, the so-called nocolok brazing method is widely used in these days. In the nocolok brazing method, oxidization is prevented by introducing inactive nitrogen gas into a brazing furnace.

However, the nocolok brazing method also has a certain drawback. Namely, since oxygen in the air is introduced into a brazing furnace in a PPM unit, an oxide film is formed on an Al surface during the brazing process. In this case, due to a difference between the thermal expansion coefficient of the oxide film and that of the Al under the oxide film, the oxide film is forced to break.

Accordingly, in order to prevent the Al surface exposed after the oxide film has broken from being oxidized, an extra processing for distributing and coating the flux on the entire surface of the heat-exchanger is required. That is, after the coolant tube and the fins are assembled together to form a heat-exchanger, mixed solution having water and flux should be distributed and coated on the entire surface of the heat exchanger before the brazing process is begun.

However, since the mixed solution of water and flux is coated on the whole surface of the heat exchanger including portions not to be bonded, a great amount of flux is consumed and a final product comes to have an unclean appearance due to the unnecessary flux attached to a Al core.

Further, since the unnecessary flux has a low adhesive property, it is likely that when the heat-exchanger is operated for a long time in, e.g., an air-conditioner disposed in a circumstance where moisture always exists, fallouts of the flux may be absorbed into a user's body, causing a variety of health problems. Still further, if the flux is coated on the fins and the coolant tube not to be bonded, the air-permeability of an air conditioner is greatly reduced, which in turn results in a deterioration in the efficiency of the air conditioner.

Besides, since a great deal of the mixture of the water and flux is blasted to components of the heat-exchanger assembled before the brazing process is initiated, fluoric ingredient of the flux and the water may invade the furnace during the brazing process to thereby entail corrosion diminishing a life time of the components.

Furthermore, if the brazing process is performed after the mixture of water and flux is sprayed and coated on the heat-exchanger assembled by a brazing jig, the flux coated on the portions not to be bonded fuses and permeate into a joint portion between the jig and the heat-exchanger. Accordingly, when the heat-exchanger is taken out of the furnace, the jig should be separated in a state where the flux has been coagulated. Thus, when the jig is separated, traces of the jig is found on the heat-exchanger and, still worse, the jig may not be separated from the heat-exchanger at all, in which case the brazed heat-exchanger should be abandoned.

In another conventional method for manufacturing a clad product for a heat-exchanger, instead of using a rolled clad member for joint portions of the heat-exchanger, a slurry having cladding material, flux powder, binders and a diluent is sprayed and coated on one side of a component to be bonded. The binders are hardened while passing through a binder drying furnace. Thereafter, the assembled heat-exchanger is subjected to the brazing furnace without undergoing through a process for coating the mixture of water and flux.

In the brazing furnace, the binders are gasified or evaporated below a brazing temperature and the cladding material and the flux are brazed so that the components of the heat-exchanger are bonded to each other. This method, however, has many demerits. At the time of preparing the slurry, the gasified diluent generates a stench. Further, material harmful to human body may be produced due to gasification of some binders and complete gasification of the diluent during the hardening process of the binders. Still further, the binders are decomposed during the brazing process so that some of the binders are gasified and some remains on the joint portions as carbons, thereby resulting in a failure to braze those portions. Still further, if the carbons exist in the furnace, the carbons may be fastened to the produced product and reduce a density of the clad material or the flux, thereby deteriorating the adhesive property of the clad material.

In another prior art method developed so as to resolve the above-described problems, there are prepared a slurry Si and flux powder, resin powder mixed with binders and a diluent. The prepared power of Si and flux, the resin powder and the diluent are mixed. Then, the mixed slurry are sprayed by a spraying unit or are coated by employing rolling coating technique or a dipping coating technuque on portions of an Al component at a room temperature. In a subsequent procedure, the diluent is evaporated by elevating the temperature thereof; the binder is decomposed and evaporated during a brazing process and then the flux and the Si are coated thereon.

In this method, however, since the cladding material and the diluent exist between cladding layers, the amount of the cladding material and the Si and the flux as well as the density of the cladding layers are greatly reduced, resulting in decrease of cladding force therefor when the cladding material and the diluent are gasified. Further, since the amount of the diluent is large, malodor is generated when the diluent is gasified and the cleanness of the brazing furnace is deteriorated, which in turn reduces a life time of a furnace muffle.

In still another prior art method, powder of Zn is first coated on an extruding tube of a heat-exchanger so as to obtain a corrosion resistance. Then, powder of Al and Si are melted and blasted to coat cladding material by employing, e.g., a thermal spray technique in which oxygen and polypropylene gases are used as heating gases.

Since, however, in this method, electric power is used as a heating source and oxygen and polypropylene gases are used as heating sources for coating, involved coats are greatly increased. Further, since only the powder of Al and Si or the powder of Al, Si and Zn is coated, the cladding material may be partially oxidized during the brazing process in a nocolok brazing furnace, thereby reducing the adhesive property of the cladding material and resulting in a failure to braze.

SUMMARY OF THE INVENTION

It is, therefore, a primary object of the present invention to provide a method and apparatus having simple structure and high efficiency with reduced procedures for manufacturing an Al clad product.

It is another object of the present invention to provide a brazing method of the Al product to enhance the quality thereof and prolong lifetime of a brazing furnace.

In accordance with a preferred embodiment of the present invention, there is provided a method for manufacturing an Al clad product including the steps of: a) fusing and coating cladding material on base material having Al; b) coating slurry material on the cladding material coated on the base material, the slurry material having mixture of a flux powder, a resin binder powder and a diluent; c) hardening the slurry material to thereby provide a hardened product including the base material, the cladding material and hardened slurry material; and d) brazing the hardened product to thereby provide an Al clad product, wherein the diluent included in the slurry material is gasified in the step (c) and the cladding material is fused by employing an arc discharge technique.

In accordance with another preferred embodiment of the present invention, there is provided a apparatus for manufacturing an Al clad product including: means for fusing and coating cladding material on base material having Al; means for coating slurry material on the cladding material coated on the base material, the slurry material having mixture of a flux powder, a resin binder powder and a diluent; means for hardening the slurry material to thereby provide a hardened product including the base material, the cladding material and hardened slurry material; and means for brazing the hardened product to thereby provide an Al clad product, wherein the diluent included in the slurry material is gasified in the hardening means and the cladding material is fused by employing an arc discharge technique.

BRIEF DESCRIPTION OF THE INVENTION

The above and other objects and features of the present invention will become apparent from the following description given in conjunction with the accompanying drawings, in which.

Figure 3:
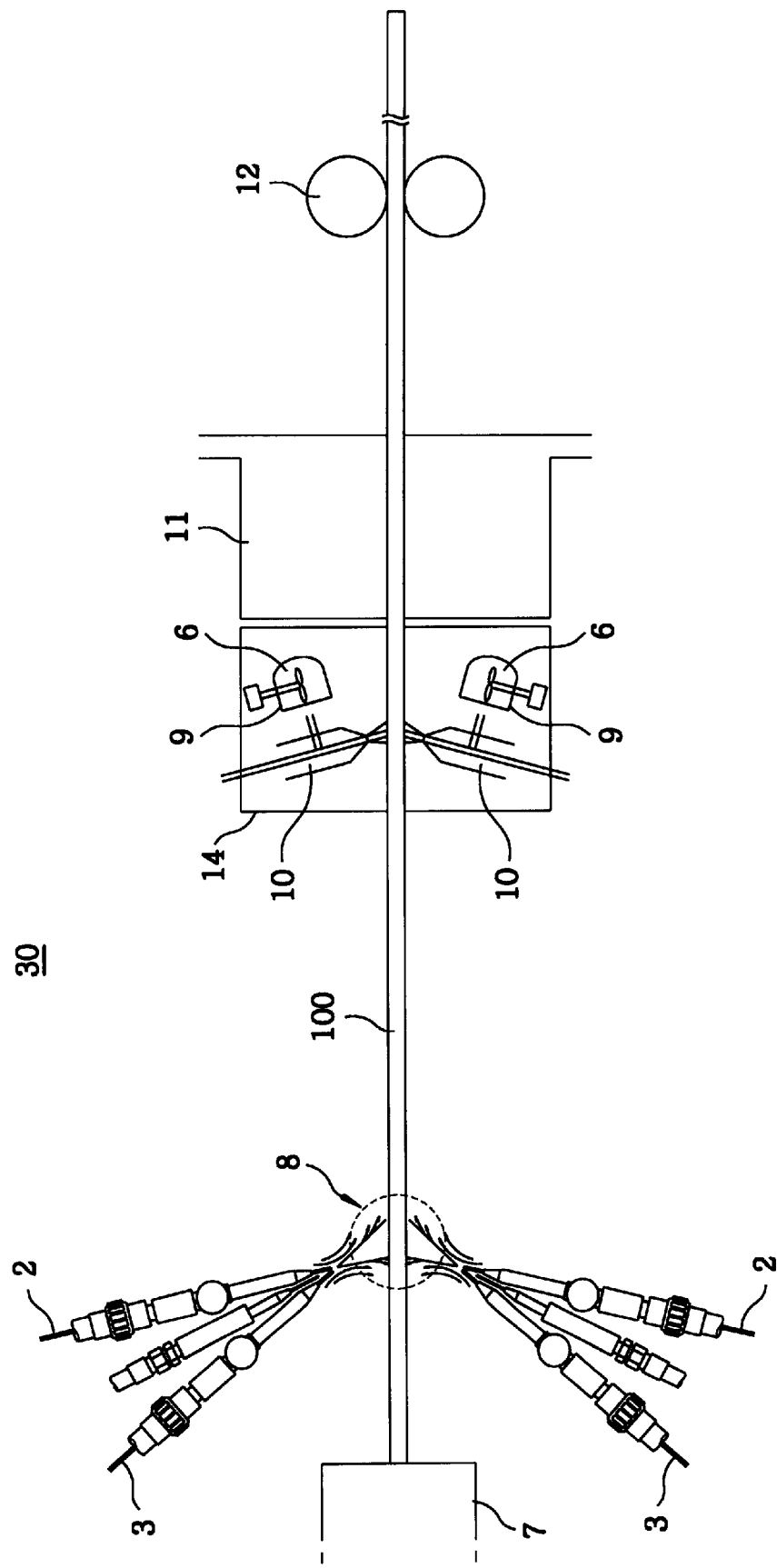
FIG. 3 illustrates an Al clad product manufacturing apparatus including a slurry-state resin binder coating section in accordance with another preferred embodiment of the present invention.
Figure 4:
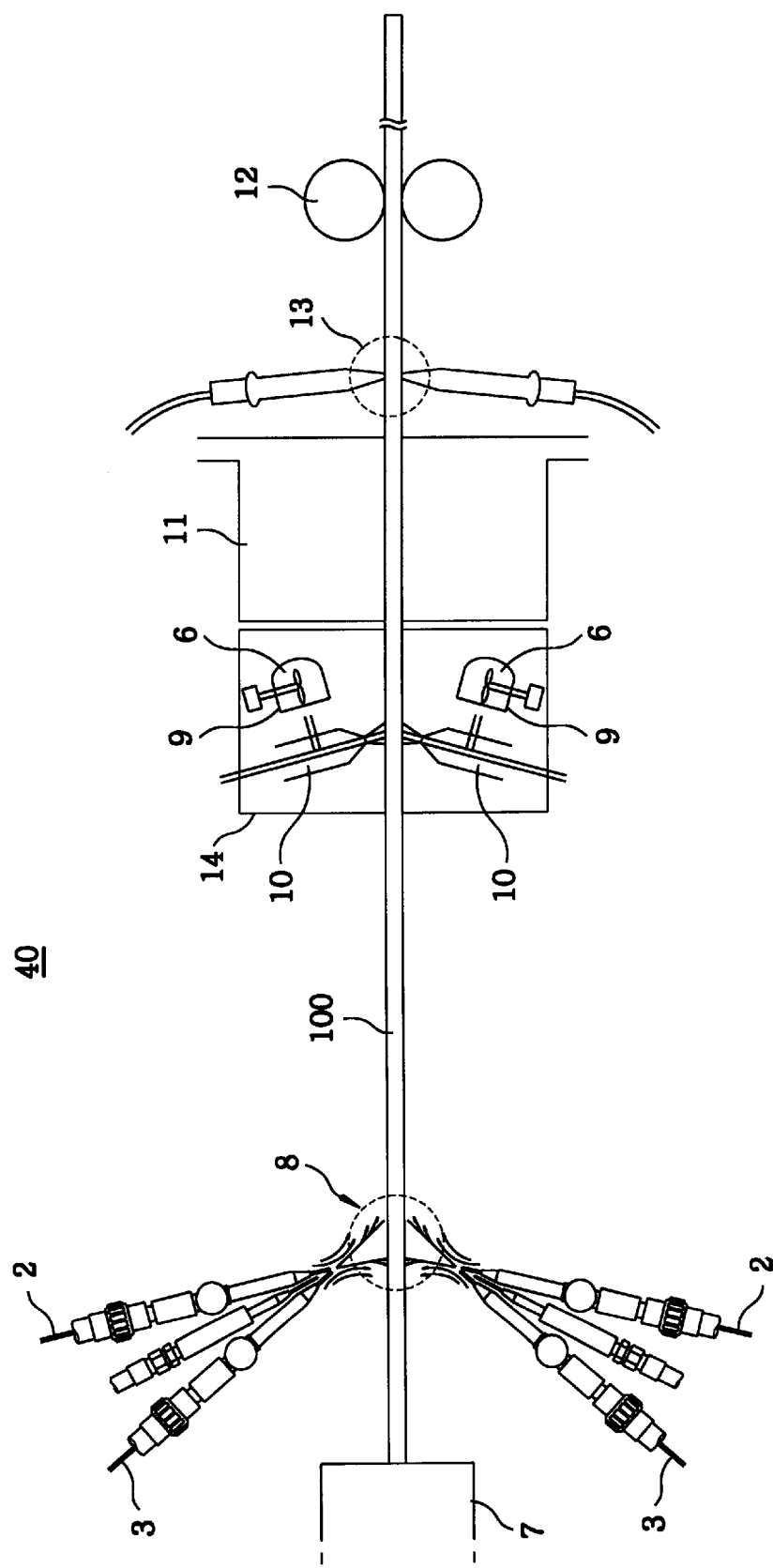

FIG. 4 presents an Al clad product manufacturing apparatus made by modifying the apparatus of FIG. 3 in accordance with still another preferred embodiment of the present invention;

FIG. 5 represents an Al clad product manufacturing apparatus made by modifying the apparatus of FIG. 3 in accordance with yet another preferred embodiment of the present invention; and FIGS. 6A to 6D set forth procedures of a method for manufacturing an Al clad product in accordance with a preferred embodiment of the present invention.

DETAILED DESCRIPTION OF THE INVENTION

Referring to FIGS. 1 to 6, a method and apparatus for manufacturing a highly efficient Al clad product will be described. Like reference numerals represent like parts in FIGS. 1 to 6.

In a preferred embodiment of the present invention, Al—Si material is formed in a wire shape and then this wire-shaped Al—Si is fused and coated on a component of a heat exchanger as cladding material. In detail, in a method for manufacturing an Al clad product in accordance with a preferred embodiment of the present invention, referring to FIG. 6A, cladding material 601, e.g., made of Al—Si is first coated on base material 600, e.g., made of Al and then slurry layer 602 is coated on the cladding material 601, wherein the slurry layer 602 may be made of mixing flux powders, binder powder of polymer resin and a diluent. The slurry layer 602 is coated on the cladding material 601 by employing a spray coating technique or a dipping coating technique.

Figure 6A:
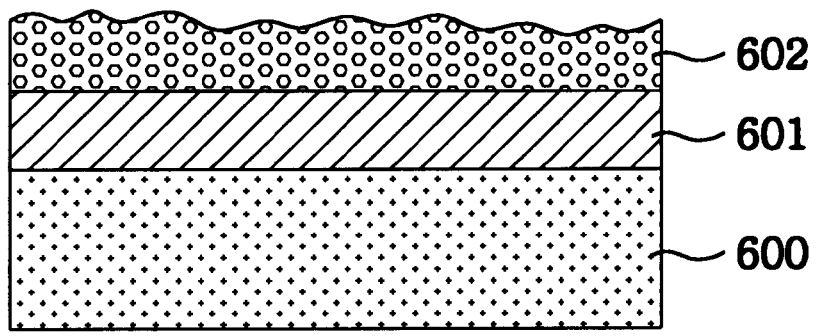
Figure 6B:
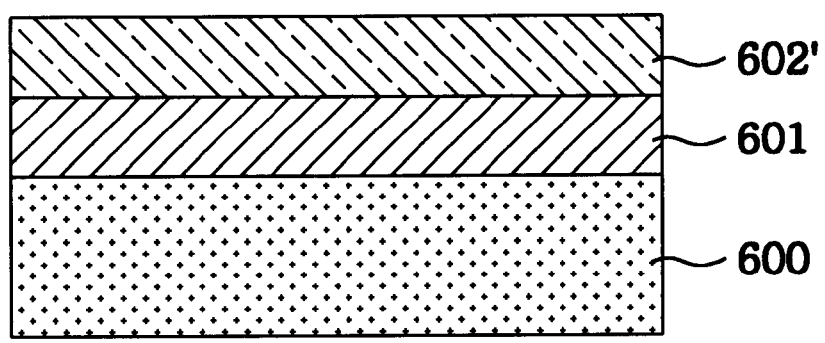

Thereafter, the slurry layer 602 is hardened to thereby form a hardened slurry layer 602' on the cladding material 601 as depicted in FIG. 6B. The slurry layer 602 is hardened by the heat originated from the base material 600 if the base material 600 is an extruded product at an elevated temperature or by heating the base material 600 with over a hardening temperature of the polymer resin included in the slurry layer 602 if the base material 600 is not an extruded product. In this hardening process, the diluent included in the slurry layer 602 is gasified.

Figure 6C:
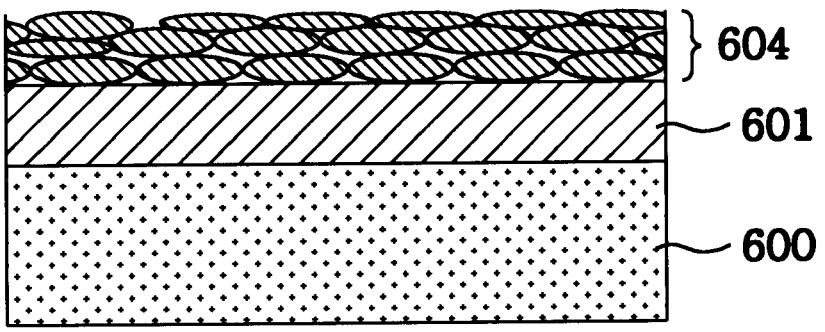

Then, a hardened product shown in FIG. 6B undergoes a brazing process in a brazing furnace. In this brazing process, the resin binder included in the slurry layer 602 is gasified or evaporated at a temperature, e.g., 500° C.–600° C., lower than the fusion point of the flux. The gasified resin binder is exhausted from the brazing furnace. As a result, a component as shown in FIG. 6C is formed, wherein the layer 604 includes flux.

Figure 6D:
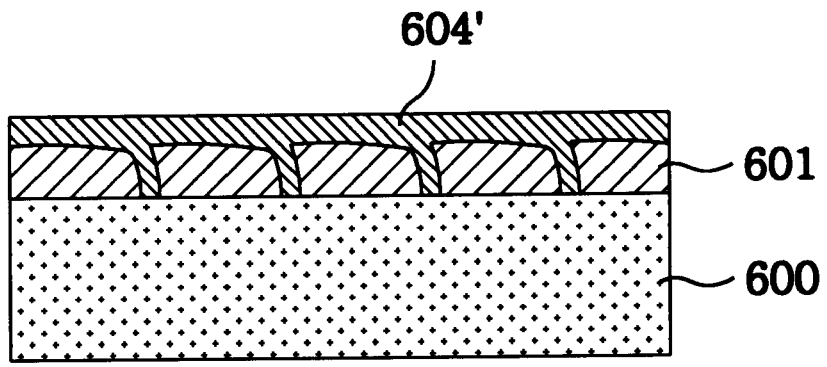

Next, when the inner temperature of the brazing furnace is elevated over the fusion point of the flux in the brazing process, the flux is fused and then the fused flux 604' is penetrated into a void or a crack in the cladding material 601 to thereby provide an Al clad product as illustrated in FIG. 6D. Accordingly, the void or the crack generated due to oxidation of the layer 601 is filled with the flux to thereby prevent the base material 600 being oxidized.

It should be noted that the cladding material 601 may be Al—Si or powder of an ally such as Al—Si—Zn, Si—Sn, Si—Zn, Sn—P—Ni. It is preferable that the thickness of the cladding material 601 ranges from about 1 mm to about 20 mm; and the thickness of the slurry layer 602 ranges from about 1 mm to about 20 mm in the present invention.

Figure 1:
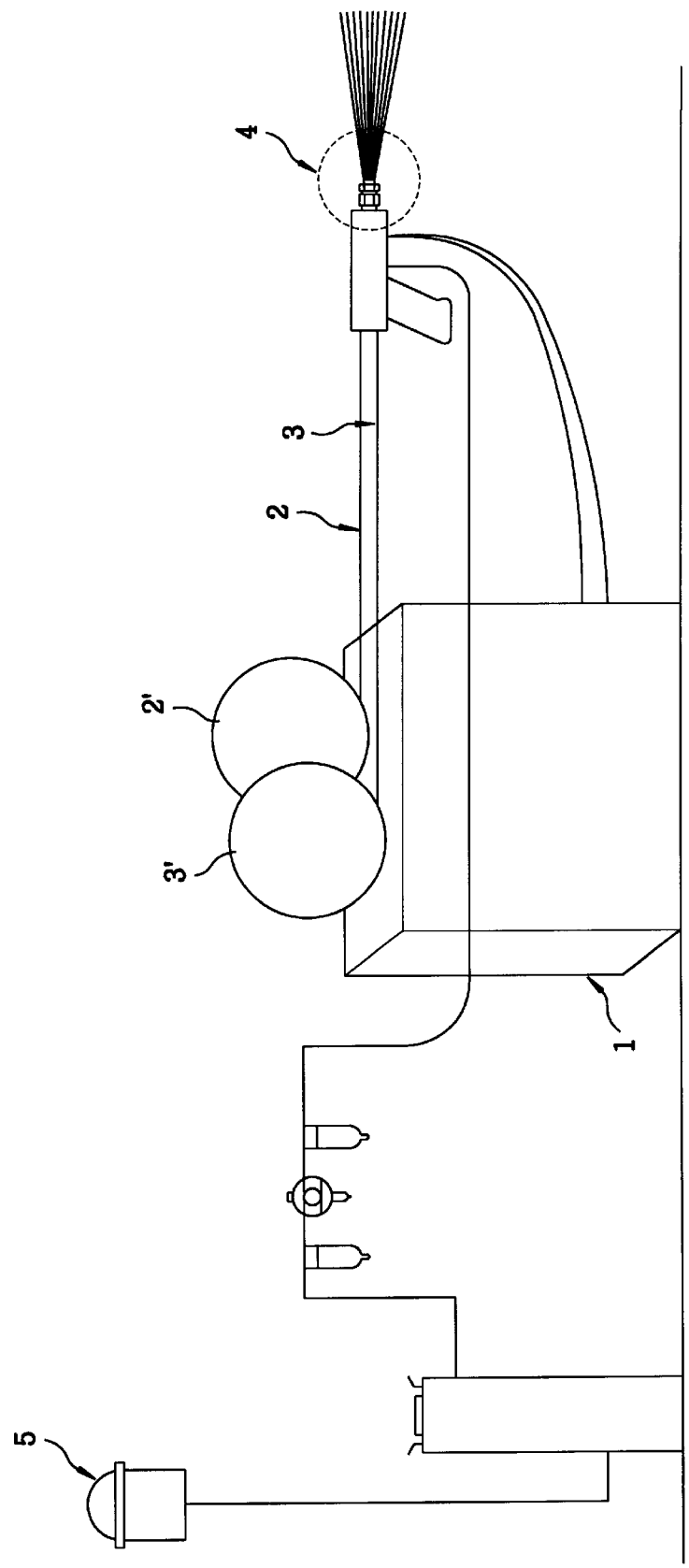
FIG. 1 shows an apparatus for manufacturing an Al clad product in accordance with a preferred embodiment of the present invention.

Referring to FIG. 1, there is shown an apparatus 10 for manufacturing an Al clad product in accordance with a preferred embodiment of the present invention. The apparatus 10 includes a power supply 1, cladding material 2 and 3 of wire shapes which are fed from corresponding payoff reels 2' and 3', respectively, a compressor 5 and a fusion section 4.

Figure 2:
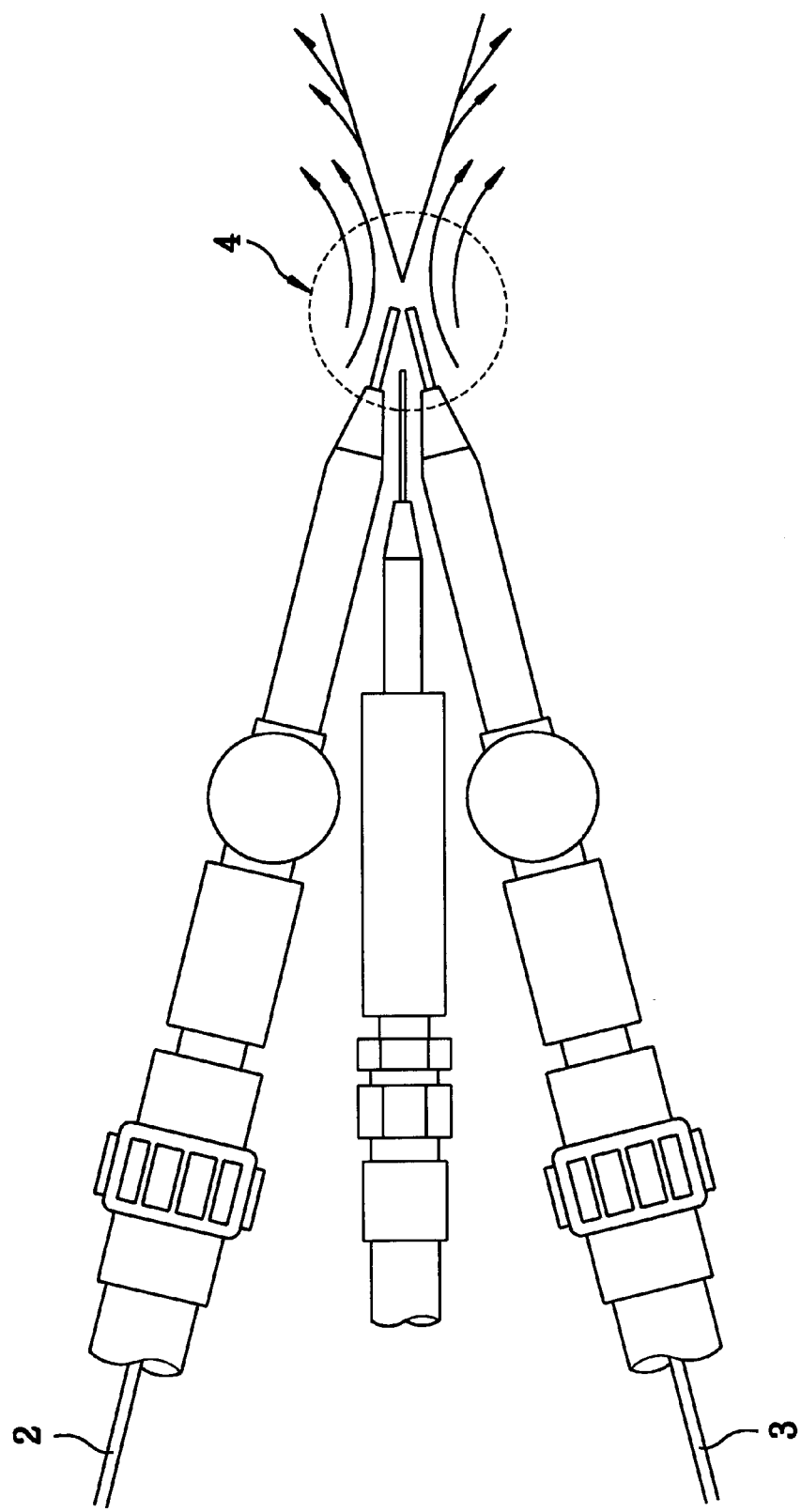
FIG. 2 depicts a diagram viewing a fusion situation of cladding material in accordance with a preferred embodiment of the present invention.

An arc discharge is generated through the contact of the cladding material 2 and 3 under a voltage applied thereon by the power supply 1. By employing this arc discharge, the cladding material 2 and 3 is fused in the fusion section 4 and then the fused cladding material are sprayed by the compressed air fed from the compressor 5. FIG. 2 depicts a diagram viewing a fusion situation of cladding material 2 and 3 in the fusion section 4 in accordance with a preferred embodiment of the present invention.

Referring to FIG. 3, there is illustrated an Al clad product manufacturing apparatus 30 including a slurry-state resin binder coating section 14 in accordance with another preferred embodiment of the present invention. The apparatus 30 includes an Al product provider 7, e.g., an extruding machine, for providing an Al product 100, a first coating section 8 for fusing and spraying the cladding material 2 and 3 on the Al product 100 to thereby provide a first coated product, a second coating section 14 (i.e., a slurry-state resin binder coating section) for coating slurry material 6 on the first coated product to thereby provide a second coated product and a hardening section 11 for hardening the second coated product, e.g., by employing hot air stream of about 70° C. to about 80° C., thereby providing a hardened product, e.g., the product as shown in FIG. 6B.

In accordance with a preferred embodiment of the present invention, the slurry material 6 is prepared by mixing a resin binder, a flux and a diluent. The apparatus 30 may further include a sizing unit 12, e.g., a compressing pinch roller, for controlling the size of the hardened product. The second coating section 14 has a slurry providing unit 9 for providing the slurry material 6 and a spraying unit 10 for spraying the slurry material 6 by employing compressed air.

FIG. 4 presents an Al clad product manufacturing apparatus 40 made by modifying the apparatus 30 of FIG. 3 in accordance with another preferred embodiment of the present invention. The apparatus 40 includes an Al product provider 7 for providing an Al product 100, a first coating section 8 for fusing and spraying the cladding material 2 and 3 on the Al product 100 to thereby provide a first coated product, a second coating section 14 for coating slurry material 6 on the first coated product to thereby provide a second coated product, a first hardening section 11 for hardening the second coated product, e.g., by employing hot air stream of about 70° C. to about 80° C., thereby providing a first hardened product and a second hardening section 13 for hardening the first hardened product, e.g., by employing an air stream of room temperature, thereby providing a second hardened product.

In accordance with a preferred embodiment of the present invention, in the apparatus 40, the slurry material 6 is prepared by mixing a resin binder a flux and a diluent. The apparatus 40 may further include a sizing unit 12, e.g., a compressing pinch roller, for controlling the size of the second hardended product. The second coating section 14 has a slurry providing unit 9 for providing the slurry material 6 and a spraying unit 10 for spraying the slurry material 6 by employing compressed air.

Referring to FIG. 5, there is illustrated an Al clad product manufacturing apparatus 50 made by modifying the apparatus 30 of FIG. 3 in accordance with yet another preferred embodiment of the present invention.

The apparatus 50 includes an Al product provider 7 for providing an Al product 100, a first coating section 8 for fusing and spraying the cladding material 2 and 3 on the Al product 100 to thereby provide a first coated product, a second coating & hardening section 11' for coating slurry material on the first coated product to provide a second coated product and then hardening the second coated product to thereby provide a hardened product. The second coating & hardening section 11' may have a slurry providing unit 9, a sizing unit 12 and a hot air inlet port 15. The second coated product is hardened by hot air fed therein through the hot air inlet port and then the hardened product is finished through the sizing unit 12.

The hardened product made by one of the methods in accordance with the above-mentioned preferred embodiments of the present invention undergoes a brazing process in a brazing furnace. In this brazing process, resin binder included in the slurry material is gasified at a temperature, e.g., 500° C.–600° C., lower than the fusion point of the flux. The gasified resin binder is exhausted from the brazing furnace. As a result, the component as shown in FIG. 6C is formed.

Next, when the inner temperature of the brazing furnace is elevated over the fusion point of the flux in the brazing process, the flux is fused and then the fused flux 604' is penetrated into a void or a crack in the cladding material 601 as illustrated in FIG. 6D, thereby providing an Al clad product.

As described in the above, in the apparatus of the present invention, since cladding material of a wire shape is fed and arc discharge is applied on the cladding material to fuse same and then a coated product is formed by fusing and spraying technique, corresponding processes become simple and a high quality clad product can be obtained.

Since in the brazing process, the flux is fused and then penetrated into a void or a crack in the cladding material, the void or the crack generated due to oxidation of the cladding material is filled with the flux to prevent the base material being oxidized, resulting in prolongation of the brazing furnace and a high adhesion force between the base material and the cladding material.

Further, since the flux is remained in the Al clad product, generation of unnecessary gas harmful to a human body is suppressed and external appearance thereof is improved and the density thereof enhanced.

While the present invention has been shown and described with respect to the preferred embodiment, it will be understood by those skilled in the art that various changes and modifications may be made without departing from the spirit and scope of the invention as defined in the following claims.

What is claimed is:

1. A method for manufacturing an Al clad product comprising the steps of:
    a) extruding a base material having Al;
    b) fusing and coating cladding material on the base material;
    c) coating slurry material on the cladding material coated on the base material, the slurry material including mixture of a flux powder, a resin binder powder and a diluent;
    d) hardening the slurry material to thereby provide a hardened product including the base material, the cladding material and hardened slurry material; and
    e) brazing the hardened product to thereby provide an Al clad product, wherein the hardening step (d) is carried out through the use of heat originated from the extruding step (a), and the diluent included in the slurry material is gasified in said step (d) and the cladding material is fused by employing an arc discharge technique.

2. The method of claim 1, wherein the cladding material has a wire shape before being coated on the base material.

3. The method of claim 1, in said step (e), the resin binder included in the slurry material is evaporated at a temperature lower than the fusion point of the flux.

4. The method of claim 3, in said step (e), when a brazing temperature is elevated over the fusion point of the flux, the flux is fused and then the fused flux is penetrated into a void or a crack in the cladding material.

5. The method of claim 1, in said step (c), the slurry material is coated on the cladding material by employing either a spraying technique or a dipping technique.

6. The method of claim 1, the thickness of the cladding material ranges from about 1 mm to about 20 mm.

7. The method of claim 1, wherein the base material is made of Al and the cladding material is made of Al—Si.

8. The method of claim 1, wherein the cladding material is made of Al—Si—Zn.

* * * * *